US010666580B1

(12) United States Patent
Callaghan et al.

(10) Patent No.: US 10,666,580 B1
(45) Date of Patent: May 26, 2020

(54) NETWORK SWITCHES USING CENTRALIZED IMPROVEMENT OF ROUTING BASED ON LINK CAPACITY

(71) Applicant: Amazon Technologies, Inc., Seattle, WA (US)

(72) Inventors: Stephen Callaghan, Kildare (IE); Amit Sahoo, San Carlos, CA (US); Frederick David Sinn, Seattle, WA (US); Ashi Ramachandran Sudhakumari, Seattle, WA (US); Arti Bhatt, Fremont, CA (US); Matthew Dean Rehder, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/968,072

(22) Filed: May 1, 2018

(51) Int. Cl.
*H04L 12/937* (2013.01)
*H04L 12/803* (2013.01)
*H04L 12/933* (2013.01)
*H04L 29/06* (2006.01)
*H04L 12/751* (2013.01)
*H04L 12/707* (2013.01)
*H04L 12/935* (2013.01)
*H04L 12/753* (2013.01)

(52) U.S. Cl.
CPC ............ *H04L 49/254* (2013.01); *H04L 45/02* (2013.01); *H04L 45/24* (2013.01); *H04L 45/48* (2013.01); *H04L 47/125* (2013.01); *H04L 49/15* (2013.01); *H04L 49/30* (2013.01); *H04L 69/18* (2013.01)

(58) Field of Classification Search
CPC ......... H04L 45/08; H04L 45/24; H04L 45/48; H04L 47/125; H04L 49/15; H04L 49/254; H04L 49/30; H04L 69/18
See application file for complete search history.

(56) References Cited

U.S. PATENT DOCUMENTS 9,807,035 B1 * 10/2017 Hanks ..................... H04L 49/25
10,193,801 B2 * 1/2019 Minei ................... H04L 45/507

OTHER PUBLICATIONS

Zhou et al., "WCMP:Weighted Cost Multipathing for Improved Fairness in Data Centers, Proceedings of the Ninth European Conference on Computer Systems," Apr. 2014, pp. 1-13.

* cited by examiner

*Primary Examiner* — Asad M Nawaz
*Assistant Examiner* — Thomas R Cairns
(74) *Attorney, Agent, or Firm* — Klarquist Sparkman, LLP

(57) ABSTRACT

A network switch and system for detecting the capacity of available paths in a network and for modifying traffic distribution at each stage of the network, such that traffic is proportionally balanced across the unequal capacity paths. A centralized controller manipulates path weights on each switch such that a load is distributed proportionately to the capacity available to ensure that all available capacity is evenly utilized. A central view of the network is used to determine capacity information, calculate a minimal change set to optimize the traffic flows, and modify the existing multipath group objects. A centralized application can use the capacity information of each switch to build a capacity model of the network. Once the full model has been built up by the application, programming of the specific decisions is done via the controller through an API in communication with each network device's local agent.

20 Claims, 7 Drawing Sheets

NETWORK SWITCHES USING CENTRALIZED IMPROVEMENT OF ROUTING BASED ON LINK CAPACITY

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path routing (ECMP), which is a strategy where next-hop packet forwarding to a destination can occur over multiple best paths. ECMP is per-hop decision limited to a single router, and can be inefficient if routers in the network are not functioning.

DETAILED DESCRIPTION

Distributed routing protocols in networks are not capacity aware so that any connectivity (i.e., wherein connectivity relates to a potential path for packets to be routed through regardless of bandwidth) enables a path or link to become viable (i.e., a cost associated with the link makes it potentially selectable), and is treated equally to all other viable links. However, links and devices can be out-of-service so that capacities throughout the network are unequal. Current protocols treat the unequal paths as equal resulting in some links being underutilized while other links are over-utilized, which is problematic. In a particular example, in a Clos network, distributed protocols are limited to utilizing paths via Equal Cost Multi Path (ECMP), which does not consider available path capacity. Operational and scaling events cause network elements to have uneven levels of capacity, which become under-utilized as an effect of ECMP.

Embodiments herein detect the capacity of available paths and modify traffic distribution at each stage of the network, such that traffic is proportionally balanced across the unequal capacity paths. Proportional balancing can be linked-based. Thus, for an example, if one device has 3 links, another device has 2 links and a third device has 1 link, then the capacities are 50%, 33%, 17%, respectively, if all links have the same capacities. If the links have different capacities (e.g., one link is 100 GB/s and another is 40 GB/s), then the particular capacity of the link can also be taken into account so as to ensure proportional balancing. A centralized view of a network via a controller infrastructure manipulates path weights on each router such that load is distributed proportionately to the capacity available. This can allow for all available capacity to be evenly utilized. In a particular embodiment, multipath groups are created with multiple physical interfaces that have common egress points from a network device. Each route points to a multipath group object, made up of multiple member interfaces. A central view of the network can be used to determine capacity information, calculate a minimal change set to improve the traffic flows, and modify the existing multipath group objects. In some embodiments, regional capacity data can also be used to weight traffic via non-ECMP inter-building spans. In order to modify the multipath groups, a centralized application uses the interconnect capacity information of each router to build a capacity model of the local network. Once a full model has been built up by the application, and actions to increase efficiency determined, programming of the specific decisions is done via a controller through an API in communication with each network device's local agent. It should be noted that the illustrated embodiment can route customer packets without the need to change a header of the packet. Additionally, standard routing protocols can be used without modification of those protocols.

Figure 1:
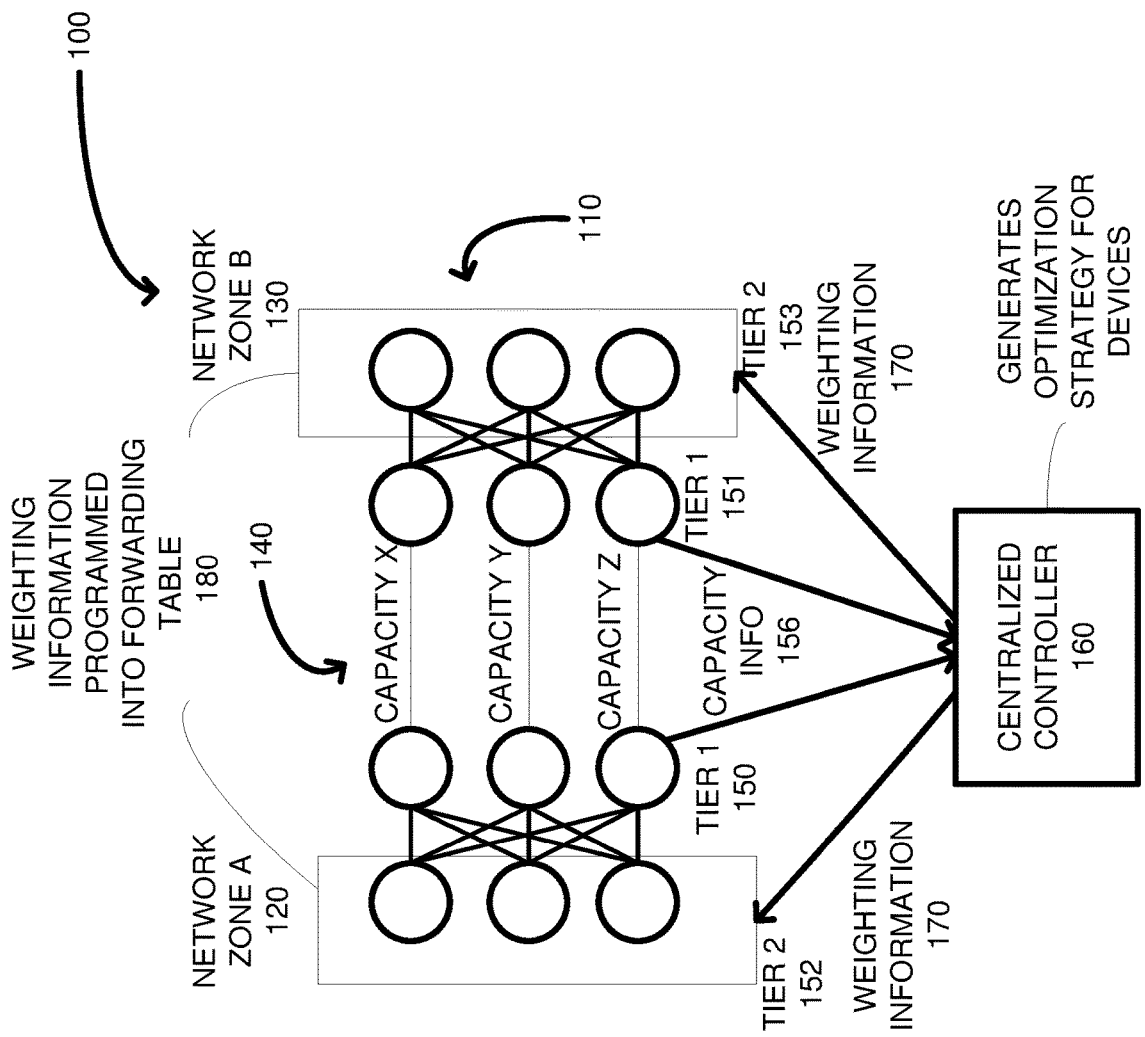
FIG. 1 is a system diagram of a hierarchical network having at least two tiers, wherein a centralized controller receives capacity information associated with links between network zones, and transmits weighting information to the hierarchical network.

FIG. 1 is a system for balancing network traffic using capacity information. A network is shown at 100. The topology of the network is generally a Clos-type network, but other network topologies can be used, such as a bus, star, or ring-type network topologies. The network 100 includes a plurality of network devices 110. The network devices can be any switches for forwarding packet data including, but not limited to, routers, switches, load balancers, firewalls, etc. The network 100 is a hierarchical network including multiple zones. In the illustrated example, the zones include network zone A 120 and network zone B 130. The zones 120, 130 for example can be separate data centers or buildings and are coupled together by links 140. Further infrastructure of the links is not shown for simplicity, but generally network zones are interconnected by cables communicating through edge routers, etc. Each network zone 120, 130 can include a hierarchical network having multiple tiers. For example, network zone A 120 includes tiers 150, 152 and network zone B includes tiers 151, 153. It is generally understood that the structure shown is only a portion of a network that is repeatable (sometimes referred to as a brick) and there are multiple such portions repeated in the network (see, for example, in FIG. 2). The tiers each include the network devices 110 coupled together such that any single network device in one tier can use any of multiple communication paths to transmit packets to the other tier.

The links 140 are shown having different capacity, such as capacity X, Y and Z between the network zones. While the potential capacity of all of the links can be equal, in practice due to faulty interfaces of network devices or other faults in the network devices, the link capacity can be unequal. The tier 1 devices 150, 151 can gather capacity information from their respective interfaces and transmit the capacity information 156 to a centralized controller 160. The centralized controller 160 can include an application (not shown) executing on one or more server computers that analyzes the overall capacity of the links 140 and generates an optimization strategy for each of the devices 110 in the network. Generally, the optimization strategy includes weighting information 170 used by the network devices to direct traffic towards higher capacity links and away from lower capacity links such that network traffic is proportionally balanced across the different paths. As shown at 180, the weighting information can be programmed into the forwarding tables of the network devices 110 so that traffic can be routed in accordance with the optimization strategy. The optimization strategy can be devised such that the actual link utilization is equal across all of the links. In order to modify the multipath groups, the centralized controller 160 uses the interconnect capacity information of each network device to build a capacity model of the local network. Once a full model has been built by the controller 160, and actions to increase efficiency determined, programming of the specific decisions is done via the controller 160 through an API with each device's local agent, as described further below. In this example, the weighting information is applied only to a higher tier in the network to redirect traffic to a lower tier. As described further below, with networks having additional tiers, the weighting information can be transmitted to multiple of the higher tier layers so as to redirect traffic across the links 140.

Figure 2:
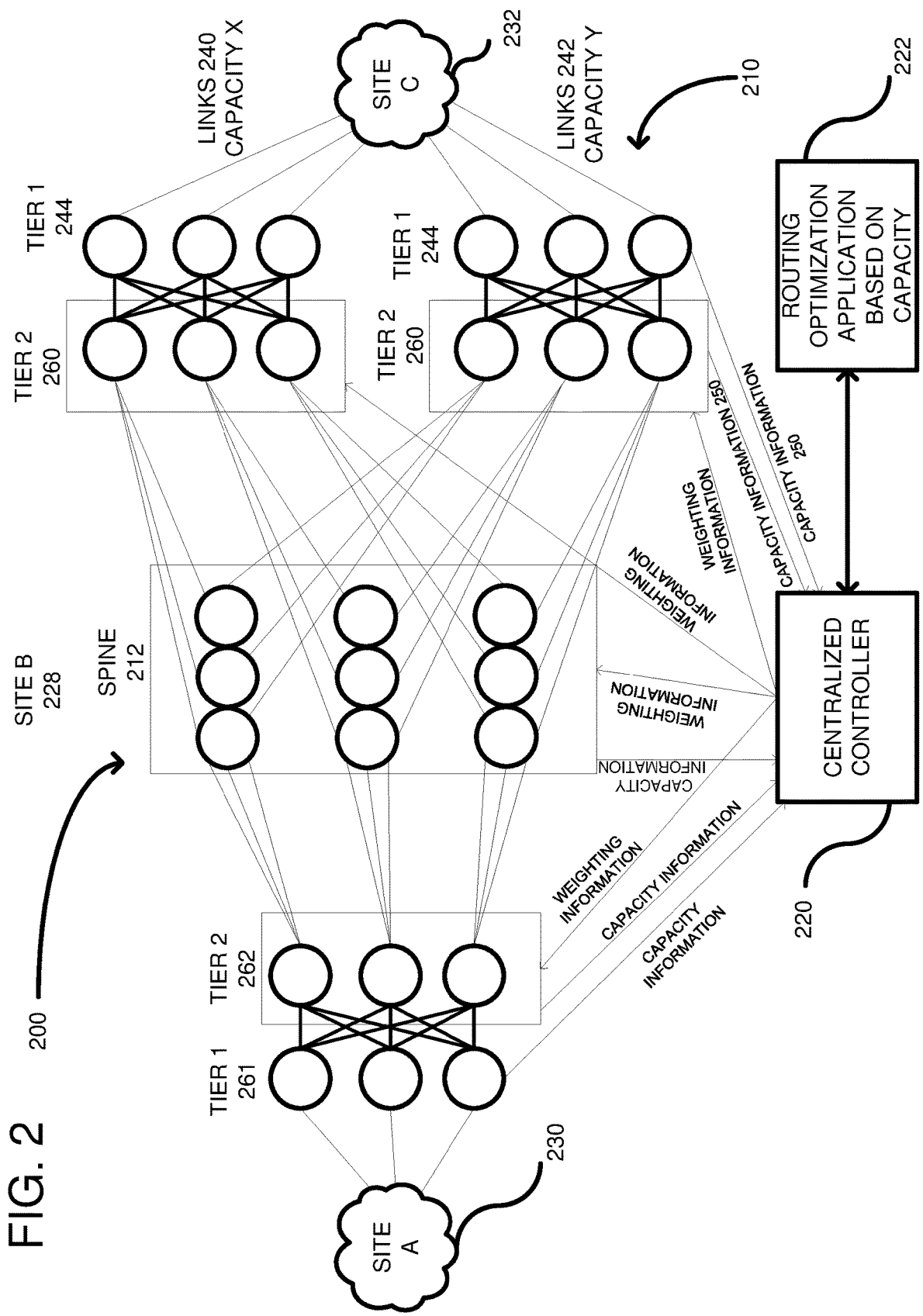
FIG. 2 is a system diagram of a hierarchical network having at least three tiers, and wherein a centralized controller distributes weighting information in accordance with a routing optimization application.

FIG. 2 is another example hierarchical network 200 having multiple layers including tiers 210 and spine layer 212. A variety of network structures can be used, such as a spine-leaf network topology or network structures having an intermediate aggregation layer. Other network topologies include Clos-type networks (two-tier Clos, three-tier Clos, etc.) In this embodiment, a centralized controller 220 executes on a server computer and is a distribution mechanism for transmitting weighting information to the tiers 210 and spine layers 212, while an application server 222 is used to generate an optimization strategy based on capacity. It should be recognized that the centralized controller described in all embodiments herein can be a distributed computing environment having multiple server computers. In this embodiment, the hierarchical network 200 is shown as a site B 228 coupled to other networks labeled site A at 230 and site C at 232. A lowest tier of the network, tier 1 244 is shown having 6 switches coupled to site C using links 240 and links 242, which have different capacities X and Y. Capacity information of tier 1 244 is passed back to the centralized controller 220 as shown at 250. Although only a single arrow 250 is shown, it is understood that all switches in the tier 1 244 are sending capacity information to the centralized controller 220 so that the centralized controller can obtain a view of each switch's capacity. Capacity information can also be received for the other tiers 260, 261 and 262 as indicated by the arrows labeled capacity information from each tier. Receiving individual capacity information for the links allows the centralized controller 220 and application 222 to obtain a more global view of network traffic across the links. This capacity information can be passed from the centralized controller 220 to the application 222 for generation of an optimization plan for each switch in the network. Using a generalized optimization plan, the application 222 can generate the weighting information and pass it to the centralized controller 220 for distribution. In turn, the centralized controller 220 can transmit the weighting information to each of the higher level tiers in the network including tier 2 at 260, 262 and the spine 212. By modifying the weights, the entire tier (called a column) connected to a site is evenly loaded such that the bricks associated with the column receive traffic proportional to their connectivity. As such, the column is treated as a shared resource among multiple bricks. By modifying weights at the spine layer 212, bricks receive traffic equal to the edge capacity available. As described more fully below, the weights are applied to the links by duplicating weights in a forwarding table. For example, A:A:B:C:D is a 2:1:1:1 weighting for next hops A, B, C, D, respectively. Thus, extra hops are inserted based on the weighting information. As shown, the weighting information to tier 2 262 is treated differently as it is coupled to a different site A 230 than tier 1 244. Also, although the weighting information is shown as generically coupled to a tier, it is understood that each switch in a tier can have its own individualized weighting. Alternatively, an entire brick can have a different weighting than other bricks in the same tier. Still further, the weighting information can be applied equally to all switches in a tier regardless of which brick it is in. In any case, the weighting information in the higher layers of the network, allow for a distribution of packets across the network based on a capacity of the links 240, 242 coupled to the lowest layer of the network.

The weighting information can be used to transmit packets in either direction on the network. Thus, for example, tier 2 262 can use the weighting information to pass packets to tier 1 261 and can also use different weighting information to pass packets to the spine 212. Thus, the weighting information is bi-directional in terms of packet transmission. Additionally, the capacity information can be received from any tier, and the optimization or weighting can be applied to any other tier. Still further, the weighting information can depend on the capacity information or operational status of any other switches in other tiers. In a simple example, the weighting information of tier 2 262 can depend on the capacity information and operational state of the spine 212, the tier 260 and the tier 244. The weighting information for tier 2 262 can further depend on the status of the links between the spine 212 and tier 2 260, the links between tier 2 260 and tier 1 244, and the links between tier 1 244 and site C 232.

Figure 3:
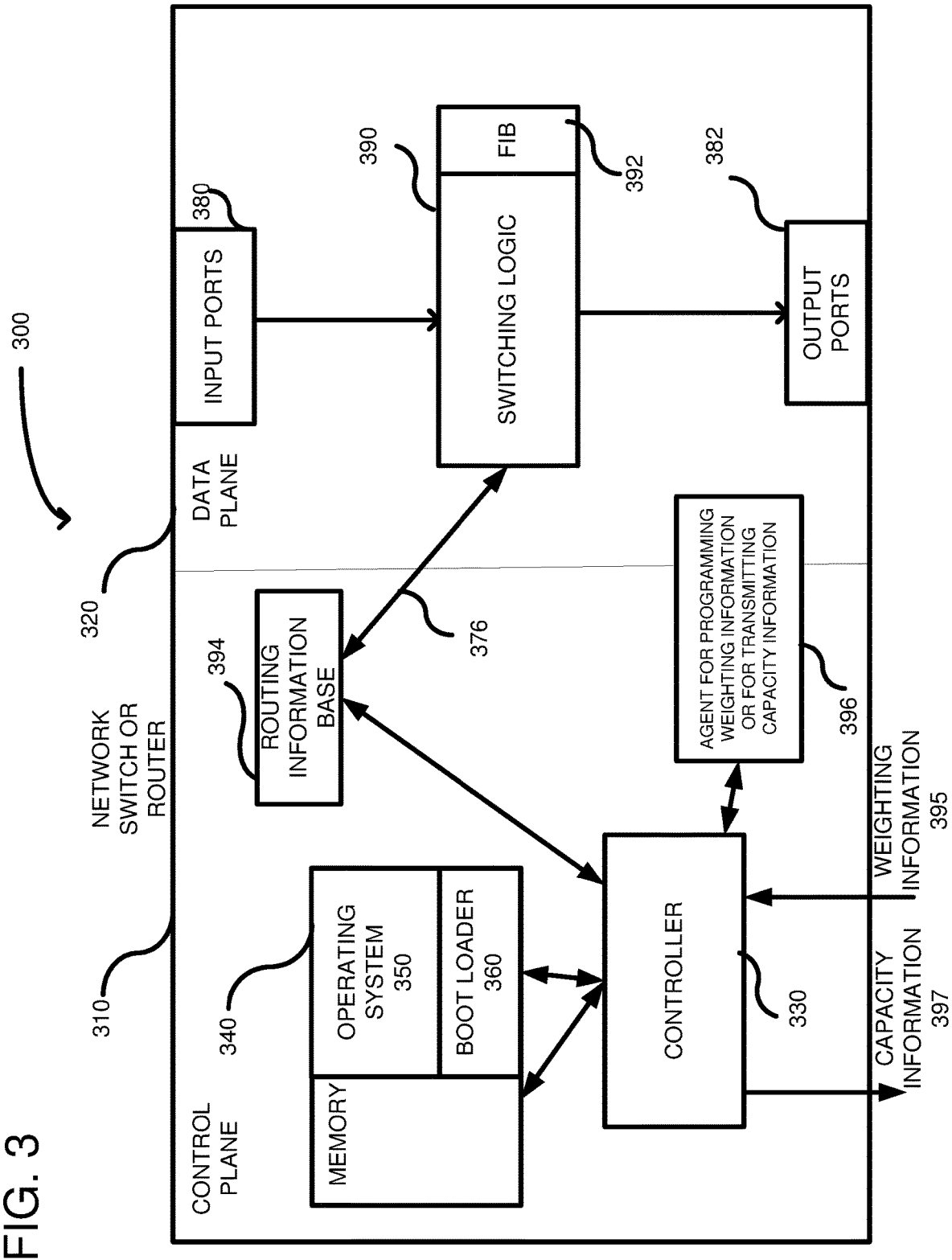
FIG. 3 is a network switch including a control plane and data plane with an agent for programming weights into a forwarding information base.

FIG. 3 is a first embodiment of a network device 300 (e.g., router or switch) that is used for forwarding packets to neighbor network devices. The network device 300 includes a control plane 310 and a data plane 320. The control plane 310 is generally a management layer for configuring, updating, and controlling the data plane 320. The control plane includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random Access Memory (DRAM), Flash memory, or other type of RAM or ROM. The memory 340 is used to store an operating system 350 for the network device 300. The memory 340 may also include a boot loader program 360, which is a first program executed after a reboot of the controller 330, and which can run basic hardware tests before booting up the operating system 350. Although a single memory is shown, the memory 340 can be divided into multiple memories and even memories of different types. A communications bus 376 allows communications between the RIB 394 and the data plane 320. The communications bus 376 can be any desired bus type, such as PCI, PCIe, AGP, etc. The data plane 320 includes input port 380 and output port 382 used for receiving and sending network packets, respectively. Switching logic 390 is positioned intermediate the input and output ports. A forwarding information base (FIB) 392 is a forwarding table that can be programmed by the control plane 310 and describes next hops for identified prefixes. Thus, routing information in terms of a next hop for a prefix is made by the switching logic 390 using the FIB.

After a reboot of the control plane 310, and, in particular, a reboot of the controller 330, the controller executes the boot loader 360 by retrieving it from the memory 340. Using the boot loader 360, the controller 330 can establish communications over the bus 376 so that the hardware bus becomes operational. The controller 330 can use one or more routing information bases 394 to generate information needed to program the FIB 392. Different routing protocols such as BGP, IS-IS, OSPF, as well as static routes can be merged together to generate the RIB 394. An agent 396 can execute on the control plane 310 (the agent 396 can be software executing on the controller) and receive the weighting information 395 from the centralized controller (160 in FIG. 1, 220 in FIG. 2). The agent 396 can use the weighting information 395 to either modify the RIB 394 or program the FIB 392 directly. Once operational, the switching logic 390 can begin transmitting packets from the input port 380 to the output port 382. In other embodiments (such as when the network switch 300 is a tier 1 switch), the agent 396 can retrieve capacity information from the output ports 382 (such as from the interfaces) and transmit the capacity information to the centralized controller as shown at 397.

Although not shown, the switching logic 390 can include an Application Specific Integrated Circuit (ASIC). More specifically, the switching logic 390 can include multiple different hardware logic blocks including a Layer 2 hardware block, a Layer 3 hardware block, and an ACL hardware block. The layer 2 hardware block relates to an Ethernet layer and can forward packets based on MAC tables. The layer 3 hardware block relates to forwarding based on a prefix match of an IP address. The ACL block relates to permissions and can include rules whether to drop packets. The different hardware blocks can be coupled in series and additional hardware blocks can be added based on the design. Packets pass from the input port 380 to the output port 382 in accordance with the configuration of the layer 2 and 3 hardware logic blocks. Although only a single input and output port are shown, typically the ASIC controls multiple ports (e.g., 4 input ports and 4 output ports). Additionally, although not shown, interfaces are located in the input and output ports. Typically, each switch controls multiple interfaces used for forwarding traffic to next hops.

Figure 4:
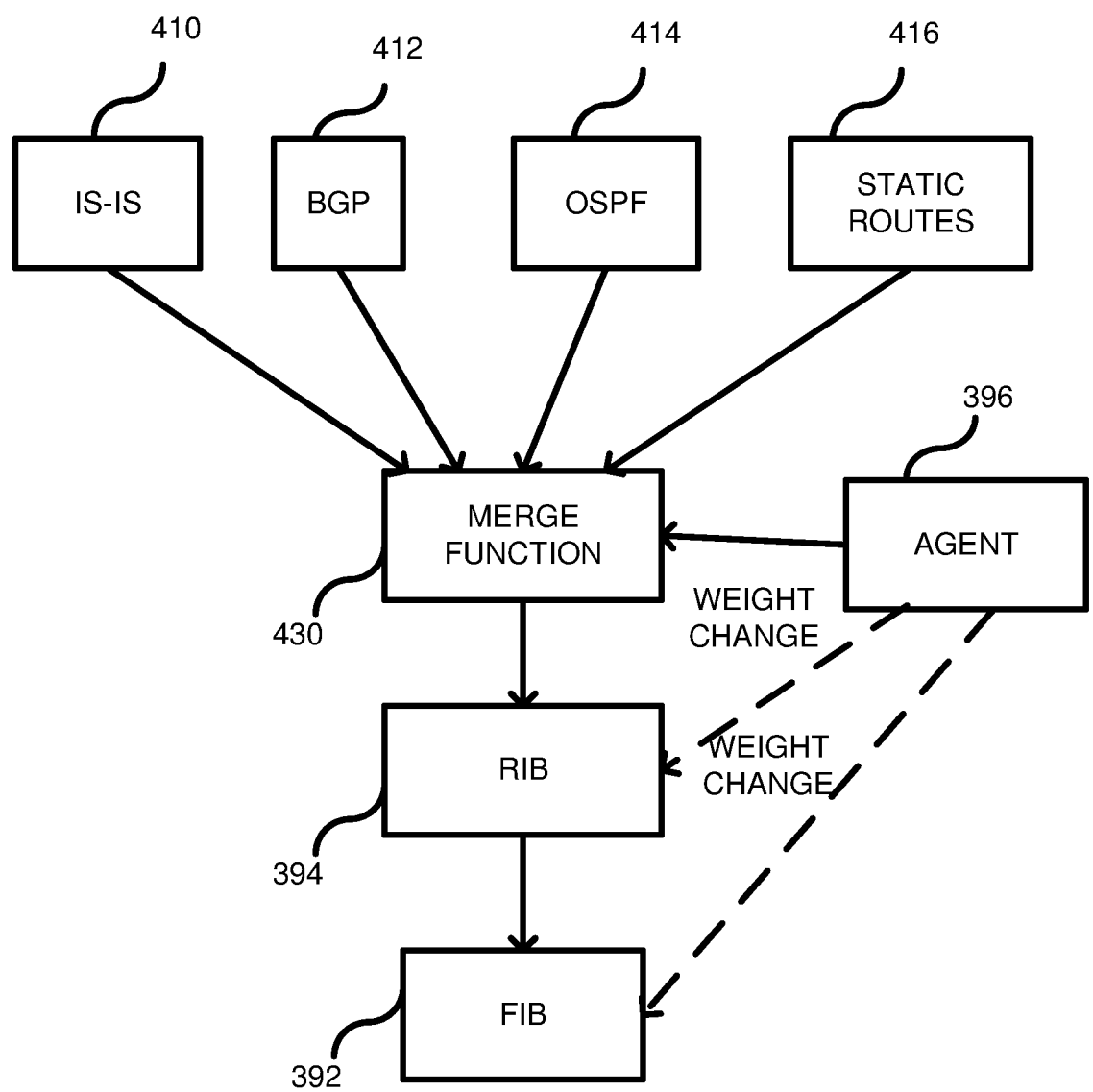
FIG. 4 is an example merge function for merging next hop information from multiple routing protocols and the agent changing weighting information.

FIG. 4 illustrates how weights are inserted into the FIB by the agent. There are numerous protocols that can be used to populate the RIB, some of which are shown in FIG. 4, including Intermediate State to Intermediate State (ISIS) protocol 410, Border Gateway Protocol (BGP), 412, Open Shortest Path Protocol (OSPF) 414, and even static routes 416, which can be injected by the operating system 350 (FIG. 3). Other protocols can be added, or some of the illustrated protocols can be removed. A merge function 430 can be executed by the controller 330. The merge function 430 allows the controller to take best path calculations of each of the different protocols 410, 412, 414 and add them together with the static routes 416 to the RIB 394. The merge function can implement merger rules, such as giving preference to certain routes based on the route type, and merging identical routes. Preferences of route types is based on the source protocol type. Some protocols are given preference over other protocols (e.g., OSPF is trusted more than BGP when constructing a RIB). The agent 396 has various options how to inject the weighting information including inputting the information into the merge function 430, modifying the RIB 394, or modifying the FIB 392. Changing weighting of the RIB or FIB includes duplicating any next hops in proportion to the weighting. Thus, using the injected weighting into the merge function 430, RIB 394 or FIB 392, the protocols 410, 412, 414 and calculations of static routes 416 need not be changed so as to avoid costly software upgrades to these routing protocols. More particularly, the protocols, such as BGP 412, can continue to generate standard BGP routes and the agent 396 can change the results using weighting down-stream of the BGP routes.

Figure 5:
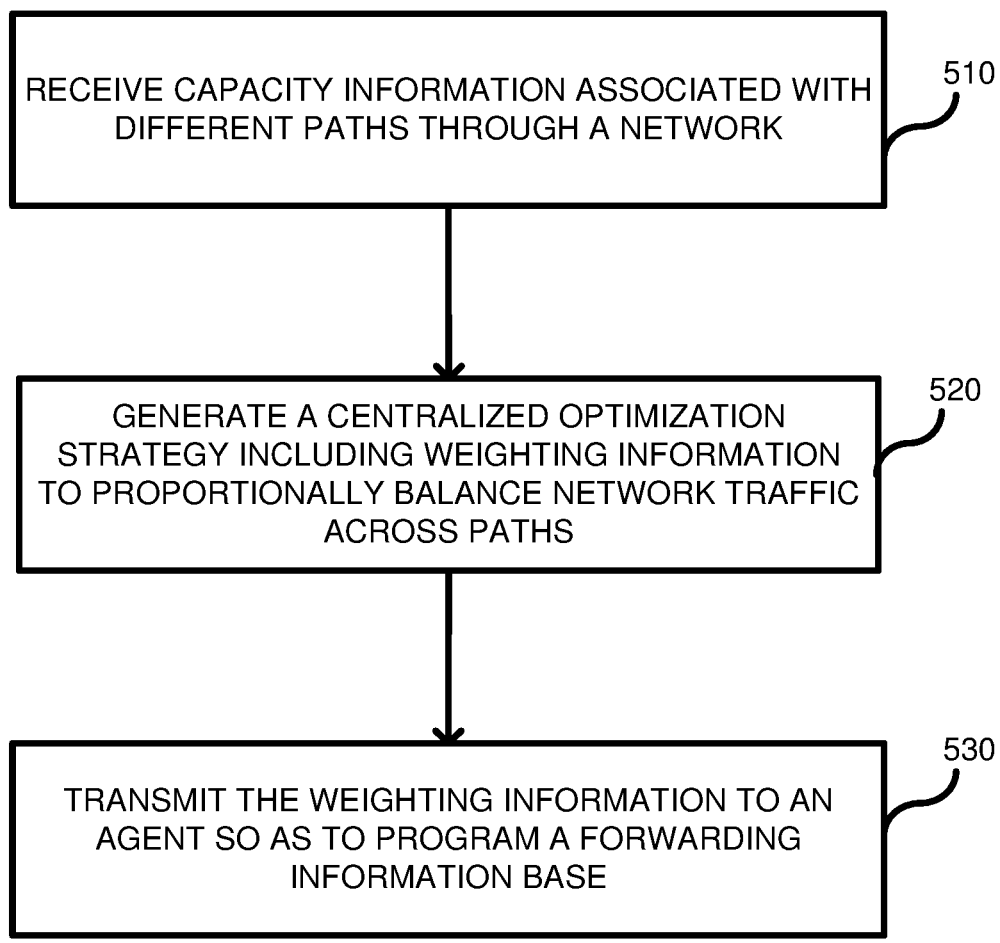
FIG. 5 is a flowchart according to one embodiment for generating weighting information based on a centralized view of capacity in network links.

FIG. 5 is a flowchart of a method for updating a network switch. In process block 510, capacity information is received that is associated with different paths through the network. For example, in FIG. 1, the centralized controller 160 receives capacity information from the network devices associated with the links interconnecting two network zones. The capacity information relates to how much of the link between the network zones is being utilized. Typically, the capacity information can be in a form of percentage utilization, for example. In process block 520, a centralized optimization strategy is generated. The optimization strategy can be achieved in a number of ways including using a linear program. The inputs into the linear program can be the capacity of the links (internal and external) and the operational state of the links (i.e., a link can be in-service, out of service, etc.) The output of the linear program is the weighting information. Other potential strategies can include using a shortest path algorithm, similar to a Dijkstra algorithm. Other algorithms can be used. Such a strategy is designed to assign weights to different links so as to proportionally balance network traffic across the links. In one example, the network traffic can be routed away from links having higher link utilization and towards links having lower link utilization. Link utilization can be extracted from the data plane to the control plane, such as through communication from the control plane with a layer 1 (not shown) of the data plane. In one example, the weighting can be designed so that all of the link utilizations are equal (e.g., 50%) across the links. In process block 530, the weighting information is transmitted to the network devices so that FIB s within the network devices can be modified using the weighting information. For example, in FIG. 3, the controller 330 can receive the weighting information 395 and transmit the weighting information to the agent 396 for consumption by the agent. The agent can then either use the weights as inputs to the merge function 430 (see FIG. 4), or modify the RIB 394 or the FIB 392 depending on the desired implementation. The weighting information can include a traffic identifier (which traffic is being influenced), a next hop, and the weight. In this case, the weight can represent a numerical number. Once the FIB is programmed, packets can be switched through the data plane of the network switch.

Figure 6:
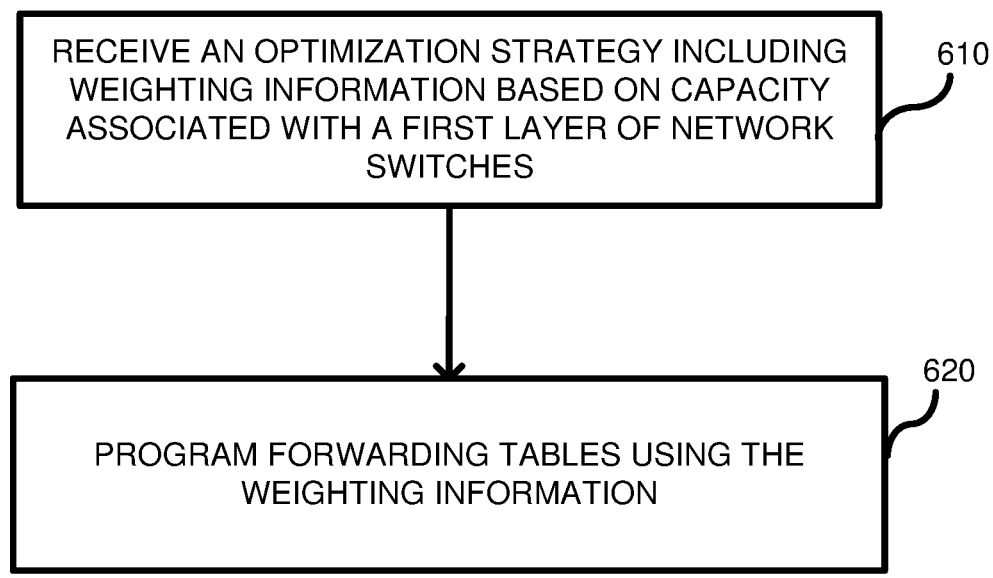
FIG. 6 is a flowchart according to another embodiment for receiving weighting information from a centralized controller and programming a network switch using the weighting information.

FIG. 6 is a flowchart of a method according to another embodiment for using capacity information to update forwarding tables in a network switch. In process block 610, an optimization strategy is received including weighting information based on capacity associated with a first layer of network switches. In particular, the weighting information relates to which network switches in a first layer of the network have higher priority to receive more traffic. For example, as shown in FIG. 1, the weighting information 170 is received in the tier 2 switches 152 from the centralized controller. Additionally, as shown in FIG. 3, the weighting information is received by the controller 330 from the perspective of the network switch. The agent 396 can then use the weighting information for configuring the data plane 320. This allows network traffic to be proportionally balanced across links in a tier. In process block 620, forwarding tables are programmed using the weighting information. By programming the forwarding tables, the agent in the network switch can cause the FIB to be modified using any of the mechanisms described above, such as by modifying the RIB or the FIB directly. For example, in FIG. 4, the agent 396 is shown programming the FIB 392 using any of a variety of options, including programming the RIB, the FIB or supplying the weighting information to the merge function 430.

Figure 7:
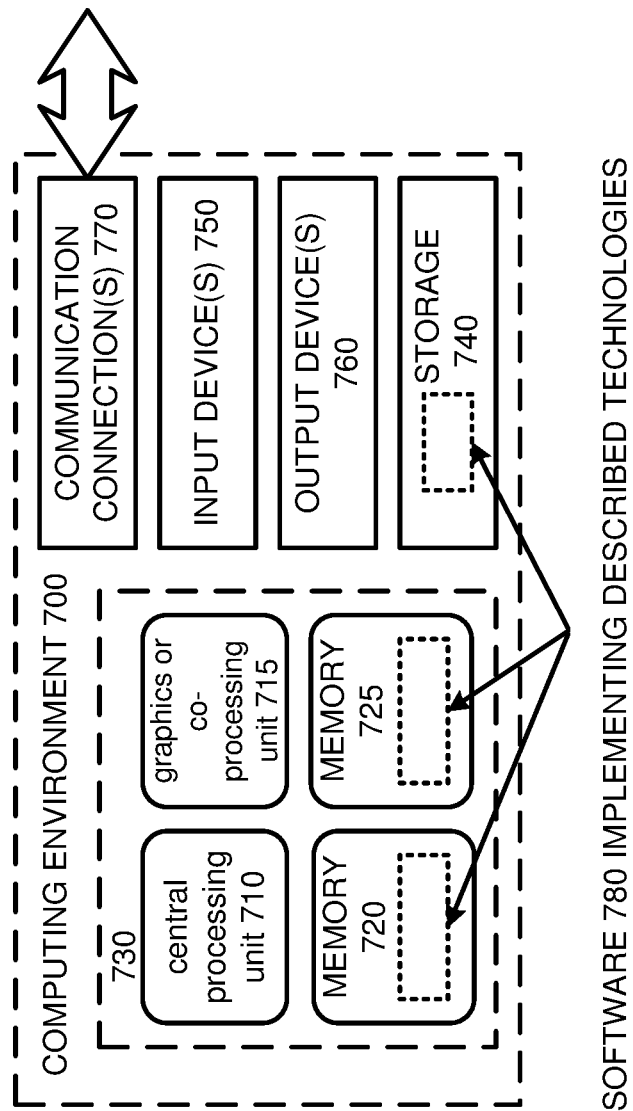
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of updating a switch in a network of switches, the method comprising:
   receiving capacity information for different paths through the network of switches, wherein the network of switches is arranged in first and second tiers, and wherein switches in the first tier have unequal capacity to transmit packets on the different paths, the capacity information including a data rate for each interface on the network switches and wherein the data rate is received from the network switches;
   generating a centralized optimization strategy for the network of switches, the centralized optimization strategy including generating weighting information for use in proportionally balancing network traffic across the different paths, the weighting information being based on the capacity information, wherein all the switches of the second tier are weighted equally; and
   transmitting the weighting information to a respective software agent running within each of the switches in the second tier for the agents to apply the weighting information to a forwarding information base (FIB) within the second tier of switches to route network traffic in accordance with the centralized optimization strategy.

2. The method of claim 1, wherein the weighting information is different for the different paths so that the switches in the second tier of switches forward a higher percentage of traffic to switches in the first tier that have more capacity than other switches in the first tier.

3. The method of claim 1, wherein the second tier is a spine layer and the first tier is a leaf layer in a spine-leaf network topology.

4. The method of claim 1, further including inserting the weighting information into a Routing information Base (RIB) after best path calculations have been made by a routing protocol.

5. The method of claim 1, wherein the network is a Clos-type network.

6. A method, comprising:
   receiving in network switches in a second layer of a hierarchical network, a strategy from a centralized controller, wherein the strategy includes weighting information for transmitting packets to a first layer of network switches in the hierarchical network, wherein the weighting information is based on capacity information, the capacity information including a data rate associated with interfaces on the second layer of network switches, wherein the capacity information is transmitted from the second layer of network switches to the centralized controller and wherein all the switches in the second layer are weighted equally; and
   programming forwarding tables in the multiple network switches in the second layer using the weighting information.

7. The method according to claim 6, further including transmitting the capacity information from the first layer of the network switches to the centralized controller.

8. The method according to claim 6, wherein an agent within the second layer of network switches changes next hop information using the weighting information after one or more protocols associated with calculating paths through the network switches have made best path calculations.

9. The method according to claim 6, wherein the weighting information is chosen so as to balance traffic proportionately to available capacity of the first layer of network switches.

10. The method according to claim 6, wherein the first layer is a leaf layer and the second layer is between the first layer and a spine layer of network switches.

11. The method according to claim 6, wherein the hierarchical network includes the second layer of network switches between the first layer of network switches and a spine layer of network switches, wherein the method further includes receiving, in the spine layer of the network switches, the weighting information based on capacity information associated with the first layer of network switches.

12. The method according to claim 6, wherein the first layer is a second tier in a Clos network and the second layer is a spine layer in a Clos network.

13. The method according to claim 6, further including inserting the weighting information into a Routing information Base (RIB) after best path calculations have been made by a routing protocol.

14. The method according to claim 6, further including merging best path calculations from multiple protocols to generate a merged table, and to insert weights into the merged table.

15. The method according to claim 14, wherein inserting weights into the merged table includes duplicating next hops into the merged table to increase the weighting of the next hops.

16. A network switch, comprising:

a controller within the network switch;

switching logic within the network switch, the switching logic being configured to transmit packets to ports on the network switch based on a forwarding table in which all second tier switches are weighted equally; and an agent executing on the controller configured to receive weighting information based on capacity of links within a network and program the forwarding table using the weighting information, wherein the capacity of the links includes a data rate for each interface on the network switch.

17. The network switch of claim 16, wherein the network switch is coupled to a central controller coupled to a plurality of network switches arranged in a hierarchical topology, wherein the agent is configured to transmit capacity information associated with a capacity of links in the network switch to the central controller so that the weighting information can be determined.

18. The network switch of claim 16, wherein the agent is configured to update a Routing information Base (RIB) after best path calculations have been made by a routing protocol, and wherein the RIB is used to program the forwarding table.

19. The network switch of claim 16, wherein the weighting information includes duplicate next hops in the forwarding table so as to transmit a higher volume of traffic to hops having higher weights.

20. The network switch of claim 16, wherein the weighting information is chosen so as to balance traffic proportionately to available capacity of a network having the network switch therein.

* * * * *